United States Patent
Chen et al.

(10) Patent No.: US 11,320,641 B2
(45) Date of Patent: May 3, 2022

(54) IMMERSION META-LENS AT VISIBLE WAVELENGTHS FOR DIFFRACTION-LIMITED IMAGING

(71) Applicant: PRESIDENT AND FELLOWS OF HARVARD COLLEGE, Cambridge, MA (US)

(72) Inventors: Wei-Ting Chen, Cambridge, MA (US); Alexander Yutong Zhu, Cambridge, MA (US); Mohammadreza Khorasaninejad, Cambridge, MA (US); Zhujun Shi, Cambridge, MA (US); Federico Capasso, Cambridge, MA (US); Vyshakh Sanjeev, Cambridge, MA (US)

(73) Assignee: PRESIDENT AND FELLOWS OF HARVARD COLLEGE, Cambridge, MA (US)

( * ) Notice: Subject to any disclaimer, the term of this patent is extended or adjusted under 35 U.S.C. 154(b) by 253 days.

(21) Appl. No.: 16/499,838

(22) PCT Filed: Mar. 29, 2018

(86) PCT No.: PCT/US2018/025294
§ 371 (c)(1),
(2) Date: Sep. 30, 2019

(87) PCT Pub. No.: WO2018/183774
PCT Pub. Date: Oct. 4, 2018

(65) Prior Publication Data
US 2020/0103640 A1 Apr. 2, 2020

Related U.S. Application Data

(60) Provisional application No. 62/480,001, filed on Mar. 31, 2017.

(51) Int. Cl.
*G02B 21/00* (2006.01)
*G02B 21/33* (2006.01)
(Continued)

(52) U.S. Cl.
CPC ............ *G02B 21/33* (2013.01); *G02B 21/26* (2013.01); *G02B 1/002* (2013.01)

(58) Field of Classification Search
CPC ......... G02B 1/00; G02B 1/002; G02B 1/005; G02B 19/00; G02B 19/0004;
(Continued)

(56) References Cited

U.S. PATENT DOCUMENTS 6,388,819 B1 5/2002 Leidig
6,548,796 B1 4/2003 Silvermintz et al.
(Continued)

OTHER PUBLICATIONS

Chen, W.T et al., "Immersion Meta-Lenses at Visible Wavelengths for Nanoscale Imaging", Nano Letters 17(5), Apr. 7, 2017, pp. 3188-3194.
(Continued)

*Primary Examiner* — Arnel C Lavarias
(74) *Attorney, Agent, or Firm* — Foley & Lardner LLP

(57) ABSTRACT

The optical imaging apparatus includes a metasurface lens including a substrate and a plurality of nano-structures patterned on a first side of the substrate. The optical imaging apparatus further includes imaging optics disposed in a spaced apart relationship with a second side of the substrate. The second side is opposite the first side on which the nano-structures are patterned. A surface of the imaging optics and the second side of the substrate define a space for accommodating an immersion fluid. The metasurface lens is configured to direct light incident on the plurality of nano-structures towards the imaging optics through the space accommodating the immersion fluid.

24 Claims, 12 Drawing Sheets

(51) Int. Cl.
*G02B 21/26* (2006.01)
*G02B 1/00* (2006.01)

(58) Field of Classification Search
CPC ............ G02B 19/0033; G02B 19/0047; G02B 19/009; G02B 21/00; G02B 21/0004; G02B 21/002; G02B 21/0032; G02B 21/02; G02B 21/06; G02B 21/08; G02B 21/36; G02B 21/361
USPC ....... 359/381, 362, 363, 368, 369, 385, 386, 359/642, 656
See application file for complete search history.

(56) References Cited

U.S. PATENT DOCUMENTS

| | | |
|---|---|---|
| 7,292,517 B2 | 11/2007 | Hendriks et al. |
| 9,151,891 B2 | 10/2015 | Ma et al. |
| 2009/0116024 A1* | 5/2009 | Mikliaev ................ G02B 21/00 356/446 |
| 2016/0306157 A1 | 10/2016 | Rho et al. |
| 2019/0049632 A1* | 2/2019 | Shin ................... G02B 27/4277 |

OTHER PUBLICATIONS

International Search Report and Written Opinion for International Patent Application No. PCT/US2018/025294, DATED Jun. 26, 2018, 10 pages.

\* cited by examiner

| | $R\ (\mu m)$ | $a_1$ | $a_2$ | $a_3$ | $a_4$ | $a_5$ | $a_6$ | $a_7$ | $a_8$ |
|---|---|---|---|---|---|---|---|---|---|
| Water meta-lens (NA = 0.1 at 532 nm) | 125 | -74.6 | 0.1 | $-2.9 \times 10^{-4}$ | $-9.5 \times 10^{-7}$ | | | | |
| Water meta-lens (NA = 0.9 at 532 nm) | 250 | -1730.7 | 292.7 | -97.1 | 40 | -17.5 | 6.9 | -2 | 0.3 |
| Oil meta-lens (NA = 1.1 at 532 nm) | 125 | -1173.7 | 318.2 | -171.3 | 110.6 | -70.2 | 36.3 | -12.5 | 2 |
| Oil Meta-lens (NA = 1.1 at 405 nm) | 125 | -1149.7 | 299.1 | -154.7 | 96.3 | -59.4 | 30.2 | -10.2 | 1.6 |
| Oil meta-lens (NA = 1.1 at 532 nm) | 450 | -4215.6 | 1137.7 | -609.8 | 392.2 | -248 | 128.2 | -44 | 7.1 |

FIG. 12

IMMERSION META-LENS AT VISIBLE WAVELENGTHS FOR DIFFRACTION-LIMITED IMAGING

CROSS-REFERENCE TO RELATED APPLICATIONS

This application is a National Stage Entry of International Application No. PCT/US2018/025294, filed on Mar. 29, 2018, which claims the benefit of and priority to U.S. Provisional Patent Application 62/480,001, filed Mar. 31, 2017, which is incorporated herein by reference in its entirety.

STATEMENT OF FEDERALLY SPONSORED RESEARCH OR DEVELOPMENT

This invention was made with Government support under FA9550-14-1-0389 and FA9550-16-1-0156 awarded by the Air Force Office of Scientific Research. The Government has certain rights in the invention.

BACKGROUND

Immersion objectives can focus light into a spot smaller than what is achievable in free space, thereby enhancing a spatial resolution for various applications such as microscopy, spectroscopy, and lithography. Despite the availability of advanced lens polishing techniques, hand-polishing is still used to manufacture the front lens of an immersion objective, which can present lens design constraints, such as having the shape of the front lens to be spherical. Therefore, several additional lenses are cascaded to correct for spherical aberration, resulting in challenges to miniaturization and adding design complexity for different immersion liquids.

SUMMARY

At least some embodiments of the present disclosure relate to liquid immersion meta-lenses, using metasurfaces, which reduce or eliminate spherical aberration at various design wavelengths in the visible spectrum, for example, encompassing wavelengths from about 400 nm to about 700 nm. The disclosed meta-lenses can be water and/or oil immersion meta-lenses of various numerical apertures (NA) up to, e.g., about 1.1, and shows that the measured focal spot sizes are diffraction-limited with Strehl ratios of, e.g., approximately 0.9 at 532 nm. By integrating the oil immersion meta-lens (NA=1.1) into a scanning confocal microscope, an imaging spatial resolution of, e.g., approximately 200 nm can be achieved. These meta-lenses can be adapted to focus light through multi-layers of different refractive indices, and also mass-produced using modern industrial manufacturing or nano-imprint techniques, leading to cost effective high-end optics.

In one aspect of the present disclosure, an immersion meta-lens includes a substrate and a plurality of nano-structures disposed on the substrate. The substrate has a first side and a second side. The substrate is configured to contact an immersion fluid at the second side. The plurality of nano-structures are disposed on the first side of the substrate. The substrate can be transparent and can include materials such as glass or silicon. The plurality of nano-structures are arranged to define a phase profile resulting in an incident collimated circularly polarized beam to be focused to a diffraction-limited spot. That is, the meta-lens can provide a resolution of about half the wavelength of the incident light.

In some embodiments, the plurality of nano-structures include at least one of titanium dioxide, silicon nitride, an oxide, a nitride, a sulfide, a pure element, and a combination thereof. In some embodiments, the incident beam has a wavelength in a near infrared region or an infrared region of an electromagnetic spectrum, and the plurality of nano-structures include at least one of silicon, amorphous silicon, gallium phosphide, and a combination thereof.

In some embodiments, a cross-section of each of the plurality of nano-fin has a two-fold symmetry. In some embodiments, the cross-section is rectangular. In some embodiments, the cross-section is elliptical. In some embodiments, the cross-section of each of the plurality of nano-fin has radial symmetry to focus polarized light having arbitrary polarization. In some embodiments, the plurality of nano-structures are arranged to define a phase profile such that the meta-lens performs as an infinite-conjugate immersion lens. In some embodiments, the plurality of nano-structures are arranged to define a phase profile such that the incident beam can be focused through one or more layers of liquids or bio-tissues. In some embodiments, the meta-lens further includes one or more layers of metasurfaces, where the plurality of nano-structures and the one or more layers of metasurfaces define the phase profile resulting in the incident beam to be focused to the diffraction-limited spot with off-normal incidence without monochromatic aberration.

In another aspect of the present disclosure, an optical imaging apparatus includes a metasurface lens including a substrate and a plurality of nano-structures patterned on a first side of the substrate. The optical imaging apparatus further includes imaging optics disposed in a spaced apart relationship with a second side of the substrate. The second side is opposite the first side on which the nano-structures are patterned. A surface of the imaging optics and the second side of the substrate define a space for accommodating an immersion fluid. The metasurface lens is configured to direct light incident on the plurality of nano-structures towards the imaging optics through the space accommodating the immersion fluid.

In some embodiments, the optical imaging apparatus further comprises the immersion fluid disposed in the space. In some embodiments, the substrate of the metasurface lens has a refractive index that is matched to a refractive index of the immersion fluid, such as where the refractive index of the substrate and the refractive index of the immersion fluid are substantially the same at a design wavelength or a range of design wavelengths.

In some embodiments, the plurality of nano-structures include a plurality of nano-structures extending out of the first side of the substrate. In some embodiments, the plurality of nano-structures include titanium dioxide. In some embodiments, the metasurface lens has a numerical aperture of about 1.1 in a visible spectrum. In some embodiments, each of the plurality of nano-structures has an associated cell size p, where the cell size p satisfies a condition of:

$$p \leq \frac{\lambda_d}{2 \cdot NA},$$

where $\lambda_d$ denotes a wavelength of the light incident on the plurality of nano-structures, and NA denotes a numerical aperture of the metasurface lens.

In some embodiments, the imaging optics include a microscope objective lens, where the surface of the imaging optics includes a surface of the microscope objective lens, and where the metasurface lens is configured to focus the incident light within the space accommodating the immersion fluid. In some embodiments, the imaging optics include a confocal microscope having a cover-glass, where the surface of the imaging optics includes a first surface of the cover-glass, where the cover-glass is configured to accommodate a target, and where the metasurface lens is configured to focus the incident light on the target. In some embodiments, the confocal microscope includes a piezo stage configured to incrementally move the target in relation to a position of a focal spot of the light focused by the metasurface lens and an imaging device configured to capture an image of the target.

In some embodiments, the metasurface lens is configured to focus light, having a wavelength of about 532 nm, incident on the plurality of nano-structures towards the imaging optics with a focal spot having an average full-width at half-maximum of about 240 nm and a Strehl ratio of about 0.94. In some embodiments, the metasurface lens is configured to provide a diffraction-limited imaging with a spatial solution of about 200 nm. In some embodiments, the immersion fluid includes at least one of oil or water.

In another aspect of the present disclosure, a method for imaging a target comprises: forming a metasurface lens having a substrate having a first side and a second side, and a plurality of nano-structures patterned on the first side of the substrate; disposing imaging optics in a spaced apart relationship with the second side of the substrate, the second side being opposite to the first side on which the nano-structures are patterned; and disposing an immersion fluid in a space defined by a surface of the imaging optics and the second side of the substrate. In some embodiments, the method further comprises: disposing a cover-glass within the space, the cover-glass accommodating an imaging target; emitting a visible light incident onto the plurality of nano-structures of the metasurface lens; and directing the visible light incident onto the plurality of nano-structures towards the imaging optics through the immersion fluid and the cover-glass.

In some embodiments, forming the metasurface lens includes forming a metasurface lens where the plurality of nano-structures include a plurality of nano-structures extending out of the first side of the substrate. In some embodiments, forming the metasurface lens includes forming a metasurface lens having a numerical aperture of about 1.1. In some embodiments, forming the metasurface lens includes forming a metasurface lens where each of the plurality of nano-structures has an associated cell size p, where the cell size p satisfies a condition of:

$$p \leq \frac{\lambda_d}{2 \cdot NA},$$

where λd denotes a wavelength of the light incident on the plurality of nano-structures, and NA denotes a numerical aperture of the metasurface lens.

In some embodiments, directing the visible light incident onto the plurality of nano-structures towards the imaging optics through the immersion fluid and the cover-glass includes focusing the visible light at a focal spot within the immersion fluid. In some embodiments, the method further includes capturing an image of the imaging target. In some embodiments, directing the visible light incident onto the plurality of nano-structures towards the imaging optics through the immersion fluid and the cover-glass includes focusing the visible light at a focal spot on the imaging target accommodated by the cover-glass. In some embodiments, the method further comprises: capturing an image of the light directed towards the imaging optics, recording a spectrum of the visible light directed towards the imaging optics, and determining a contribution to an intensity of a pixel of a captured image by light at a first wavelength. In some embodiments, emitting a visible light includes emitting a collimated visible light.

BRIEF DESCRIPTION OF THE DRAWINGS

For a better understanding of the nature and objects of some embodiments of this disclosure, reference should be made to the following detailed description taken in conjunction with the accompanying drawings.

FIG. 12 illustrates a table listing polynomial coefficients of immersion meta-lens phase profiles of example immersion meta-lenses.

DETAILED DESCRIPTION

Figure 1:
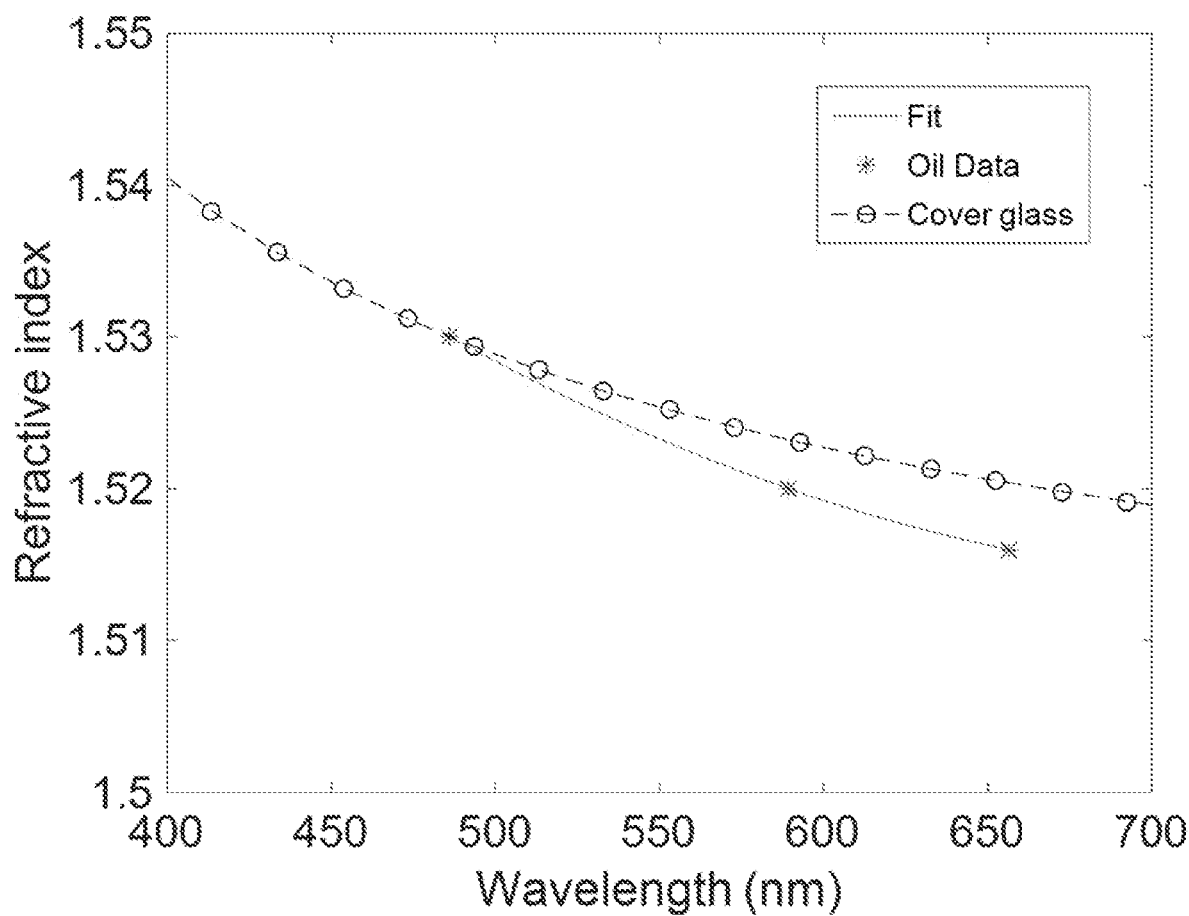
FIG. 1 illustrates refractive indices of immersion oil and cover glass used for designing oil immersion meta-lenses.

Lens immersion technique can be used to enhance spatial resolution of a lithography or imaging system by adding a layer of liquid between the front lens of an objective and a specimen. One example of this technique includes the use of water immersion lenses in deep ultraviolet steppers in semiconductor manufacturing. This allows the fabrication of complementary metal-oxide-semiconductor (CMOS) gates having widths of a few tens of nanometers using excimer lasers at about 193 nm wavelength. In microscopy, an immersion objective may include a front lens. In some examples, the front lens has a shape that is usually planoconvex with a diameter of a few millimeters. The convex surface possesses a large curvature to provide sufficient optical power, which is reciprocal of the focal length of a lens. The large curvature can constrain fabrication, and may involve hand-polishing. Additional lenses can also be cascaded to reduce a spherical aberration induced by the spherical shape of the front lens, thereby increasing an overall device volume, design complexity, and cost.

Metasurfaces having sub-wavelength nano-structures patterned on a substrate can have the ability to simultaneously control an amplitude, a phase and/or a polarization of light in a compact configuration. The thickness of a metasurface (excluding its supporting substrate) can be of the order of, e.g., few wavelengths, which provides a platform to realize compact optical devices, such as holograms, polarimeters, modulators and lenses. These devices can be realized with high efficiency by using, for example, plasmonic or high refractive index dielectric nanostructures in reflection and transmission configurations, respectively.

In some embodiments, the devices discussed herein may utilize, e.g., $TiO_2$ nano-fins fabricated with atomic layer deposition (ALD) to provide planar water and/or oil immersion lenses (referred to as meta-lenses hereinafter) with numerical apertures (NA) up to, e.g., about 1.1 in the visible spectrum. Note that the immersion meta-lenses are designed using subwavelength nanostructures, which provides more precise and efficient phase control compared to binary amplitude/phase Fresnel zone plates. The water immersion meta-lenses have diffraction-limited focal spots with Strehl ratios higher than, e.g., about 0.9 at design wavelengths $\lambda_d$ equal to, e.g., about 532 nm. These meta-lenses can be tailored for any immersion liquid. As an example, the disclosure herein also provides oil immersion meta-lenses with diffraction-limited focal spots, at $\lambda_d$ equal to, e.g., about 532 nm and about 405 nm, with Strehl ratios higher than, e.g., about 0.8. By integrating the meta-lens designed at $\lambda_d$ of about 532 nm in a scanning confocal microscope setup, an imaging spatial resolution as small as about 200 nm can be achieved.

In some embodiments, nano-fins or other nano-structures have a square or a rectangular cross-sectional area. In some embodiments, the nano-fins have cross-sectional areas of other shapes, such as circular or elliptical. In some embodiments, the cross-sections of the nano-fins have two-fold symmetry. In some embodiments, the cross-sections of the nano-fins have a radial symmetry for focusing an polarized light having an arbitrary polarization. In some embodiments, the nano-fins include a dielectric material. Examples of suitable dielectric materials include metal and non-metal oxides (such as an oxide of aluminum, silicon, hafnium, zinc, magnesium, or titanium), metal and non-metal nitrides (such as nitrides of silicon, boron, or tungsten), metal and non-metal sulfides, and pure elements (e.g., silicon for operation at near-infrared and mid-infrared wavelengths).

In some implementations, nano-fins or other nano-structures have a ratio of a height over a width of greater than 1, such as at least about 1.5, at least about 2, at least about 3, at least about 4, or at least about 5, and up to about 10 or greater, or up to about 20 or greater.

The disclosed liquid immersion planar meta-lenses with NAs up to 1.1 show that the meta-lenses can be tailored for any liquid, and may provide diffraction-limited focal spots at design wavelengths. By integrating the meta-lens into a scanning confocal microscope, diffraction-limited imaging with, e.g., a spatial resolution of, e.g., about 200 nm at wavelength $\lambda$ of about 532 nm can be achieved. The meta-lenses can be designed taking into account the refractive index of multi-layers, which makes them useful for numerous applications in optical lithography, laser-based microscopy and spectroscopy. The single-layer lithographic fabrication of meta-lenses can overcome the drawbacks or challenges of manual lens-polishing techniques, and can be mass-produced with existing foundry technology (e.g., deep-UV steppers) or nano-imprinting for cost effective high-end immersion optics.

Design and Fabrication of Immersion Lens

In some embodiments, the immersion meta-lenses disclosed herein can be designed in an infinite-conjugate configuration. A collimated plane-wave sequentially passes through nano-fins, which impart a given phase profile $\varphi(x, y)$, and a microscope cover glass before being focused in an immersion liquid. Note that in this configuration, the nano-structures are not directly in contact with liquid. This not only provides protection when the immersion meta-lenses are used in imaging, but also prevents the lowering of efficiency due to reduction of the refractive index contrast between $TiO_2$ nano-fins and their surrounding medium.

The immersion meta-lenses can be designed, e.g., for at least two different liquids, such as, water and/or oil. The refractive index of oil can be matched to that of the cover glass substrate. FIG. 1 illustrates refractive indices of immersion oil and cover glass used for designing oil immersion meta-lenses. As shown in FIG. 1, the refractive index mismatch at about 532 nm is about 0.001, which is about 0.06% of the refractive index of the cover glass.

The phase profile $\varphi(x,y)$ at a design wavelength $\lambda_d$ for a given position $(x, y)$ can be obtained using the ray-tracing method such that all rays arrive at the focal spot in phase. In some embodiments, commercial software (such as OpticsStudio, Zemax LLC) can be used to determine the optimal phase profile $\varphi(x, y)$. By utilizing the geometric phase principle, the desired $\varphi(x, y)$ can be determined for left-handed circularly polarized incident light by the rotation of each nano-fin at $(x, y)$ through the relation $\varphi(x, y)=2\alpha$, where $\alpha$ is the rotation angle of a nano-fin. It is understood that the $\varphi(x, y)$ also can be determined for incident light having other polarizations.

The unit cell size p, width w, length l and height h of an individual nano-fin can be optimized by parameter sweeping using three-dimensional finite difference time domain (FDTD) method (using, for example, software tools provided by Lumerical Inc.) to improve polarization conversion efficiency at the design wavelength $\lambda_d$. To improve the latter, the nano-fin can be designed as half-wave plate. The parameters w, l, h, p for meta-lenses designed at $\lambda_d$ of about 532 nm and $\lambda_d$ of about 405 nm may be about 80 nm, about 220 nm, about 600 nm, about 240 nm and about 60 nm, about 120 nm, about 600 nm, about 150 nm, respectively.

Figure 2:
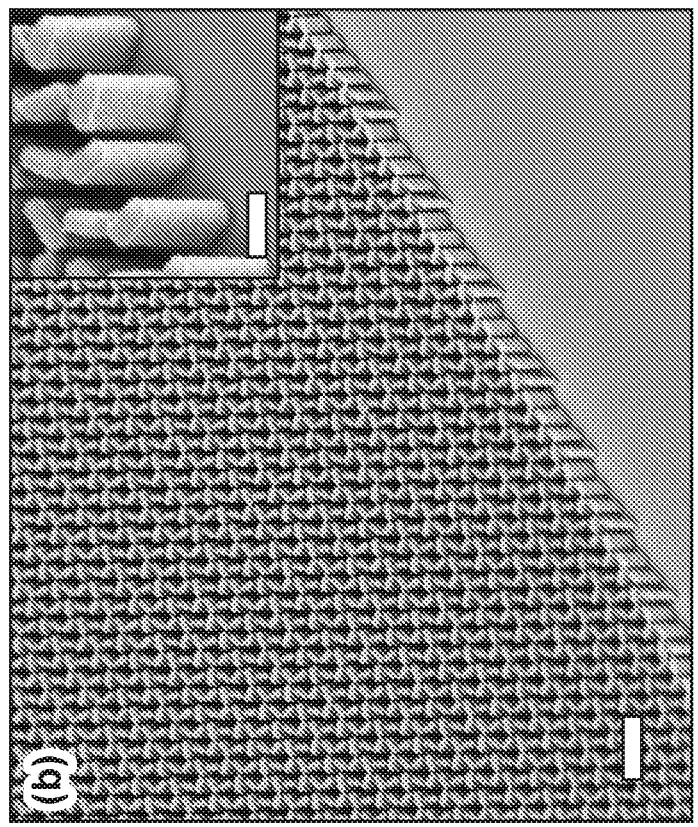
FIG. 2 illustrates scanning electron microscope images for an oil immersion meta-lens.
Figure 2:
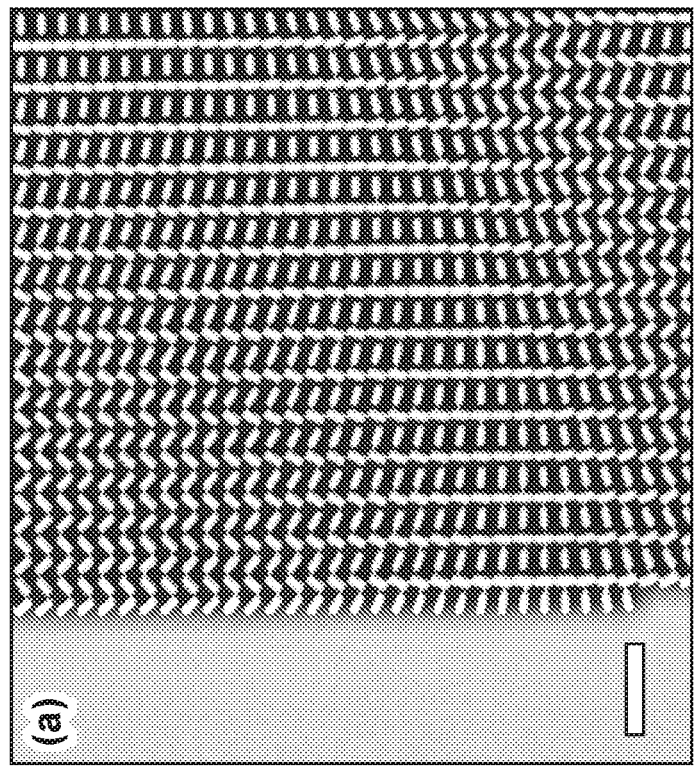

In one or more embodiments, the immersion meta-lenses can be fabricated using atomic layer deposition (ALD). The use of ALD in the fabrication process can not only ensure low surface roughness, but also straight sidewalls compared to dry-etching processes. FIG. 2 illustrates scanning electron microscope images for the oil immersion meta-lens designed at about 532 nm. Part (a) of FIG. 2 shows a top view image of the meta-lenses at the edge. Part (b) of FIG. 2 shows an oblique view of the meta-lens at about 45 degrees. The scale bar is about 1 about 1 μm. The inset shows a magnified image, with a scale bar of about 500 nm.

In one or more implementations, the phase profile $\varphi(x,y)$ is discretely imparted due to the finite unit cell size p in the design of the nano-fins, which in turn can affect the value of NA. This can be understood by the Nyquist-Shannon sampling theorem in the spatial domain. The maximum transverse wavenumber provided by a meta-lens at $\lambda_d$ is $$k_{max} = \frac{1}{\lambda_d} \cdot NA,$$

where NA is the designed numerical aperture at $\lambda_d$. To prevent spherical aberration, the following condition can be satisfied:

$$p \leq \frac{\lambda_d}{2 \cdot NA}. \quad (1)$$

For example, for a meta-lens designed at $\lambda_d$ of about 532 nm and $\lambda_d$ of about 405 nm p can be equal to about 240 nm and about 150 nm, respectively. This corresponds to a maximum achievable NA of about 1.1 and about 1.35, respectively. The smaller the p, the larger the achievable NA, and consequently the higher the efficiency of the meta-lens due to better sampling. However, for a given set of (w, l, h), the peak polarization conversion efficiency of the nano-fin blue-shifts as p decreases. To maintain high efficiency at $\lambda_d$, one can either increase the ratio of l/w or the height h.

Characterization of Immersion Meta-Lens

FIG. 3(a) illustrates a schematic of an example set-up for characterizing the immersion meta-lenses. The inset shows an image taken when measuring a water immersion meta-lens with NA of about 0.9 at about 532 nm. The insert shows a spot that results from the scattering of light from the water immersion meta-lens. FIG. 3(b) illustrates a schematic for a scanning confocal microscope integrated with an oil immersion meta-lens for nanoscale imaging. The oil immersion meta-lens focuses normally incident light to a diffraction-limited spot on a target. The target can be fabricated on a cover glass substrate, and can be scanned by moving a piezo stage. The scattered light can be collected by an objective designed for imaging through a cover glass with thickness about 170 μm.

The relative z'-axis is defined with its origin at the center of focal spot in FIG. 3(a). In FIG. 3(a), since the focal spots of meta-lenses are embedded inside immersion liquids, to reduce the aberrations of the measurement system, water or oil immersion objectives with NAs higher than that of immersion meta-lenses have been selectively used.

Figure 3:
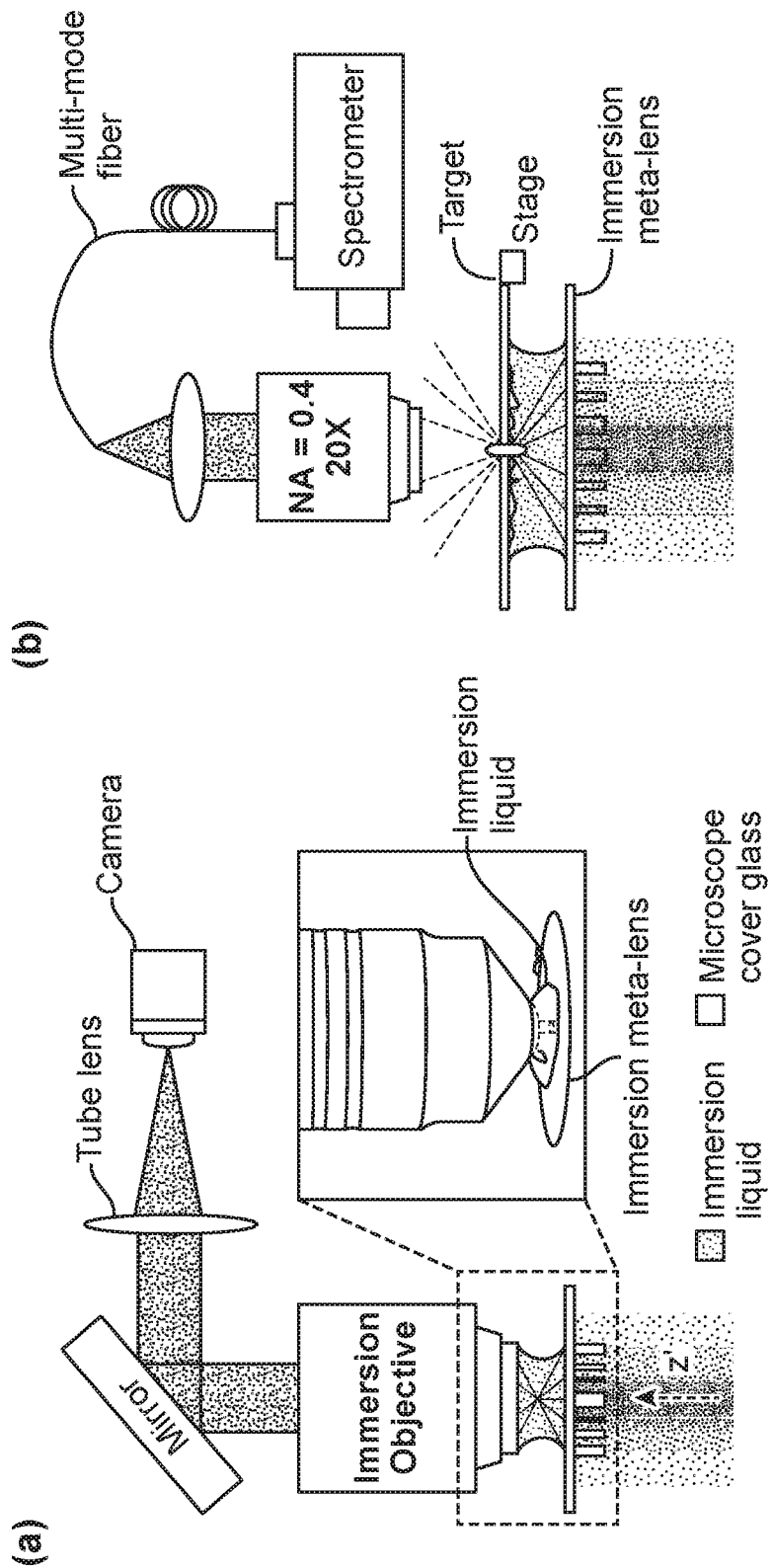
FIG. 3 illustrates a schematic of an example set-up for characterizing immersion meta-lenses and a schematic for a scanning confocal microscope integrated with an oil immersion meta-lens for nanoscale imaging.
Figure 4:
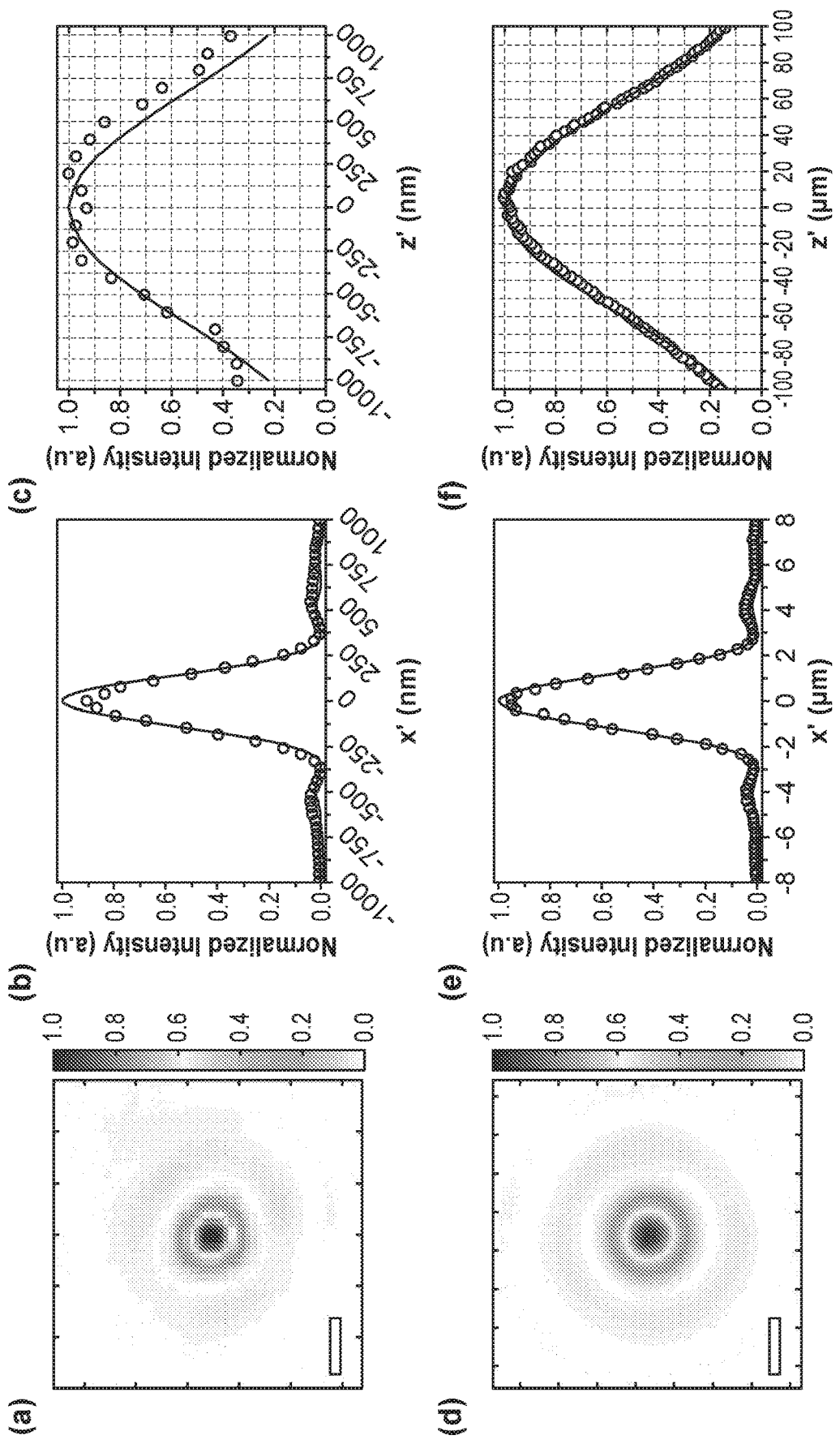
FIG. 4 illustrates characterization of focal spots for water immersion meta-lenses with various numerical apertures (NAs).

FIG. 4 illustrates characterization of focal spots for water immersion meta-lenses with NA of about 0.9 (first row) and NA of about 0.1 (second row) designed at $\lambda_d$ of about 532 nm. Part (a) of FIG. 4 shows a normalized intensity profile of the focal spot from the meta-lens with NA of about 0.9. The scale bar is about 400 nm. Part (b) shows a horizontal cut of the profile of part (a) with the intensity normalized to the corresponding diffraction-limited Airy disk (illustrated as a curve) for the same given area. The Strehl ratio can be obtained by dividing the peak intensity value of measured (dots) to that expected from theory (curve). Part (c) shows a measured intensity variation at the center of the focal spot (dots) along propagation direction (e.g., z'-axis shown in FIG. 3). The curve of part (c) shows theoretical prediction from OpticsStudio (Zemax Inc.). The depth of focus can be estimated from the width of the curve at a normalized intensity equals to about 0.8. Parts (d), (e) and (f) of FIG. 4 show corresponding analysis for a meta-lens with NA of about 0.1. The scale bar in part (d) is about 2 μm.

FIG. 4(a) shows a highly symmetric focal spot with an average full-width at half-maximum (FWHM) of about 316±13 nm and a Strehl ratio of about 0.9 (as shown in FIG. 4(b)). This demonstrates that the water immersion meta-lens meets the stipulations for diffraction-limited focusing: FWHM≈0.51λ/NA and Strehl ratio≥0.8. The focusing efficiency of this meta-lens is wavelength-dependent and has a peak of 42% at about 550 nm for circularly polarized light.

Figure 5:
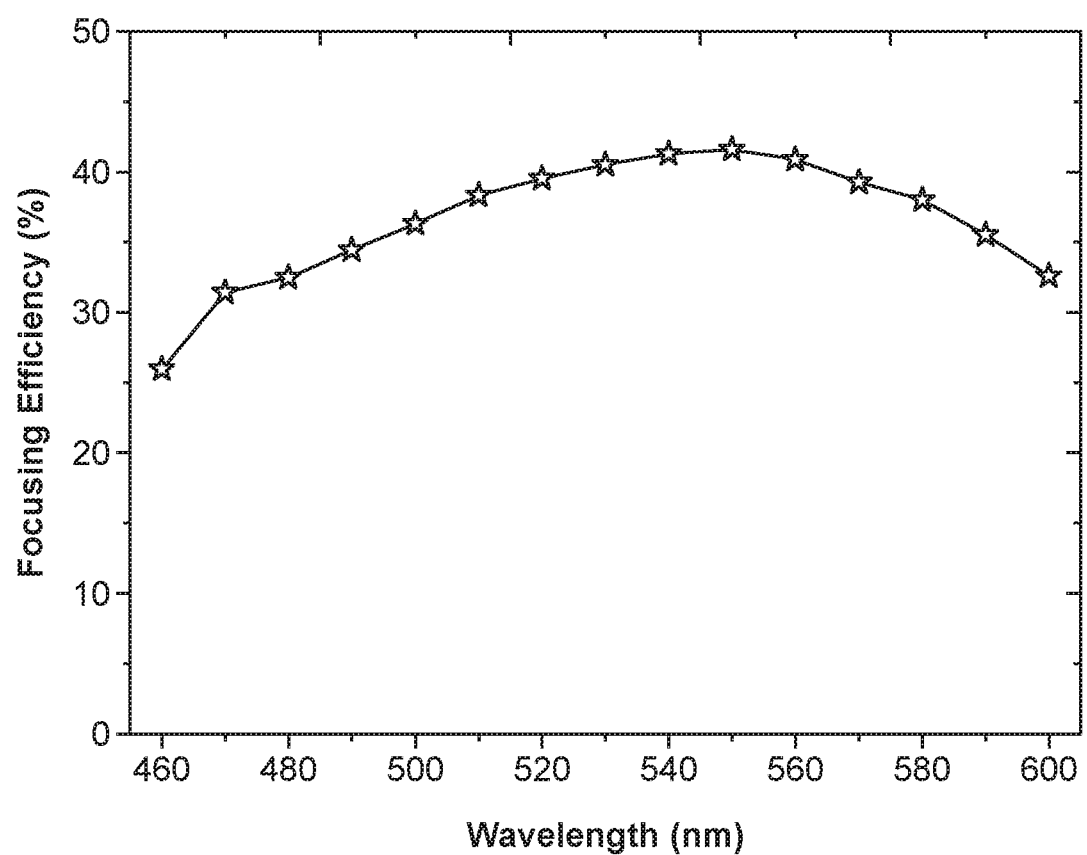
FIG. 5 illustrates measured focusing efficiency for a water immersion meta-lens.

FIG. 5 illustrates measured focusing efficiency for a water immersion meta-lens with an NA=about 0.9 designed at about 532 nm. The efficiency was measured, in case of circularly polarized incidence, by dividing the power of the focal spot by the total power passing through an aperture with the same diameter as the water immersion meta-lens.

Figure 6:
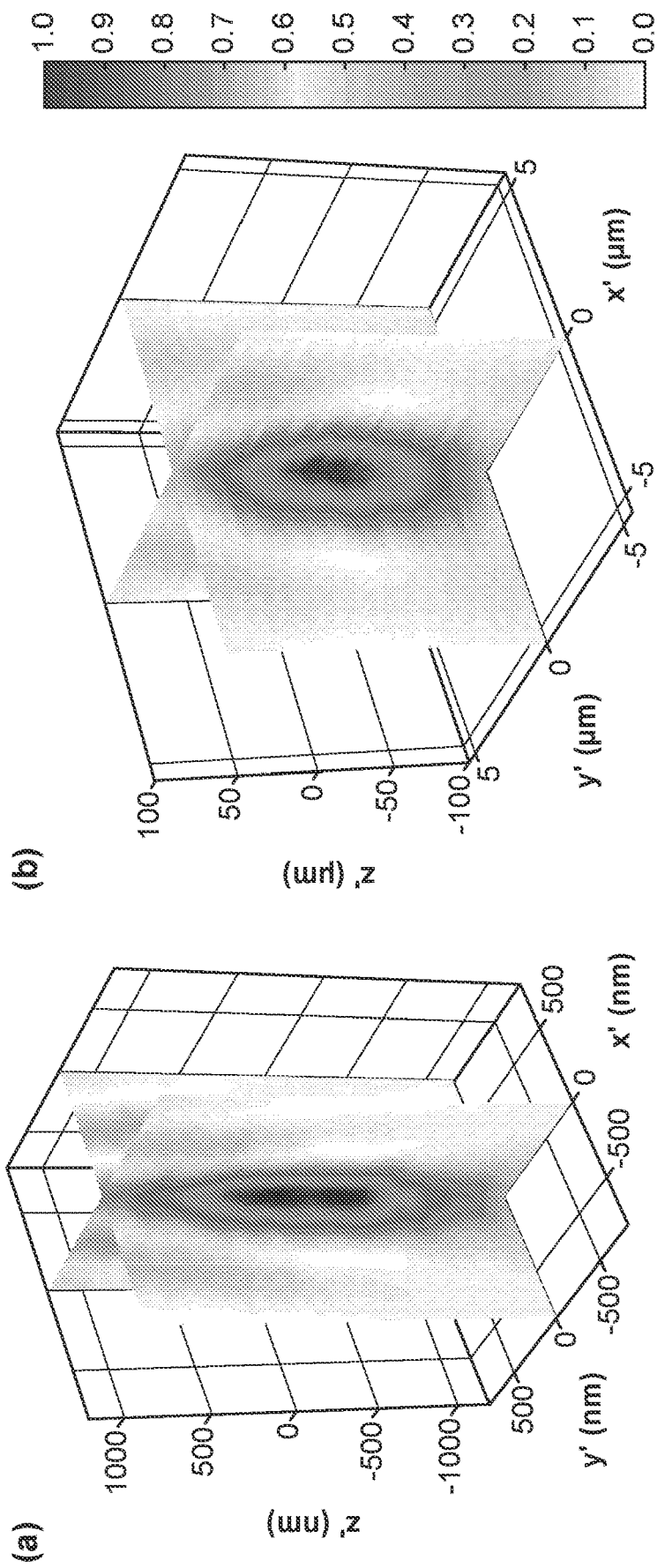
FIG. 6 illustrates focal spot profiles for meta-lenses with various NAs.

To characterize the depth of focus (DOF), the water immersion objective may be moved step by step vertically using a stepper motor. An image may be recorded for each step corresponding to different z'-planes as shown in FIG. 3(a). This process maps the intensity distribution of the focal spot. FIG. 6 illustrates focal spot profiles for meta-lenses with an NA of about 0.9 (part (a)) and an NA of about 0.1 (part (b)). These plots were interpolated from measurement data taken by moving the water immersion objective about 100 nm and about 2 per step.

FIG. 4(c) shows a plot of the intensity (dots) at the center of focal spot along the z'-direction (optical axis) normalized to the maximum intensity in the focal region, while the curve shows the numerical prediction from an optical software tool, such as OpticsStudio by Zemax LLC. The measured DOF corresponds to the difference of right and left boundary for the region with normalized intensity larger than about 0.8. The theoretical DOF can be deduced using the optical analogue of the uncertainty principle given by:

$$DOF = \frac{\lambda}{2n[1 - \cos(\theta)]} \quad (2)$$

where n is the refractive index of immersion liquid and $$\theta = \sin^{-1}\left(\frac{NA}{n}\right)$$

is the maximum diffraction angle at the edge of meta-lens. Note that Eq. (2) becomes $$\frac{n\lambda}{NA^2}$$

for small NAs, giving the approximation that the DOF is inversely proportional to the square of NA. Similar analysis for a lower NA=0.1 water immersion meta-lens is shown in FIGS. 4(d), 4(e) and 4(f). The averaged FWHM, Strehl ratio and DOF are 2.51±0.02 μm, about 0.97 and about 70 μm, respectively. For a lower NA, the experimental data agrees better with the results from OpticsStudio, because its DOF is larger, implying larger vibration tolerance in measurement.

Figure 7:
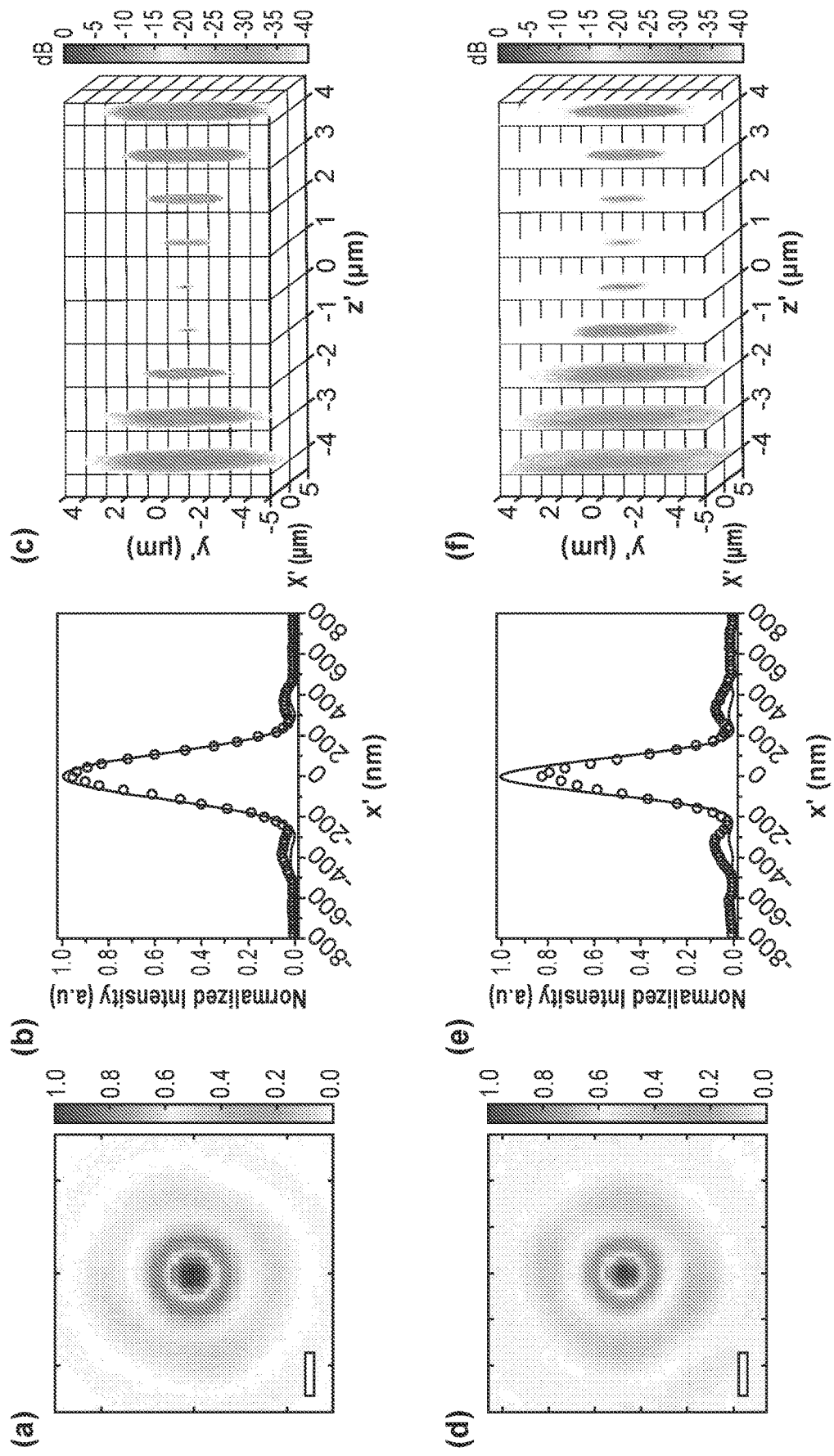
FIG. 7 illustrates focusing characterization of oil immersion meta-lenses.

FIG. 7 illustrates focusing characterization of oil immersion meta-lenses with NA=1.1 at their design wavelengths. Part (a) of FIG. 7 shows a normalized intensity profile of a focal spot from the meta-lens designed at about 532 nm. Part (b) shows an intensity distribution (dots) from the horizontal cut of part (a) normalized to the intensity of a diffraction-limited Airy disk (curve) for a given area. The focal spot has an average FWHM of about 240±4 nm and a Strehl ratio of about 0.94.

Part (c) shows an intensity distribution in dB scale on the x'-z' plane, showing the evolution of the beam from 4 μm before to 4 μm after the focus. Part (c) shows the focal spot intensity profile of this meta-lens in different x'-z' planes.

The negligible background signal demonstrates excellent phase realization, where the beam converges to a diffraction-limited spot. The immersion meta-lens can also be designed at other wavelengths in the visible spectrum.

Figure 8:
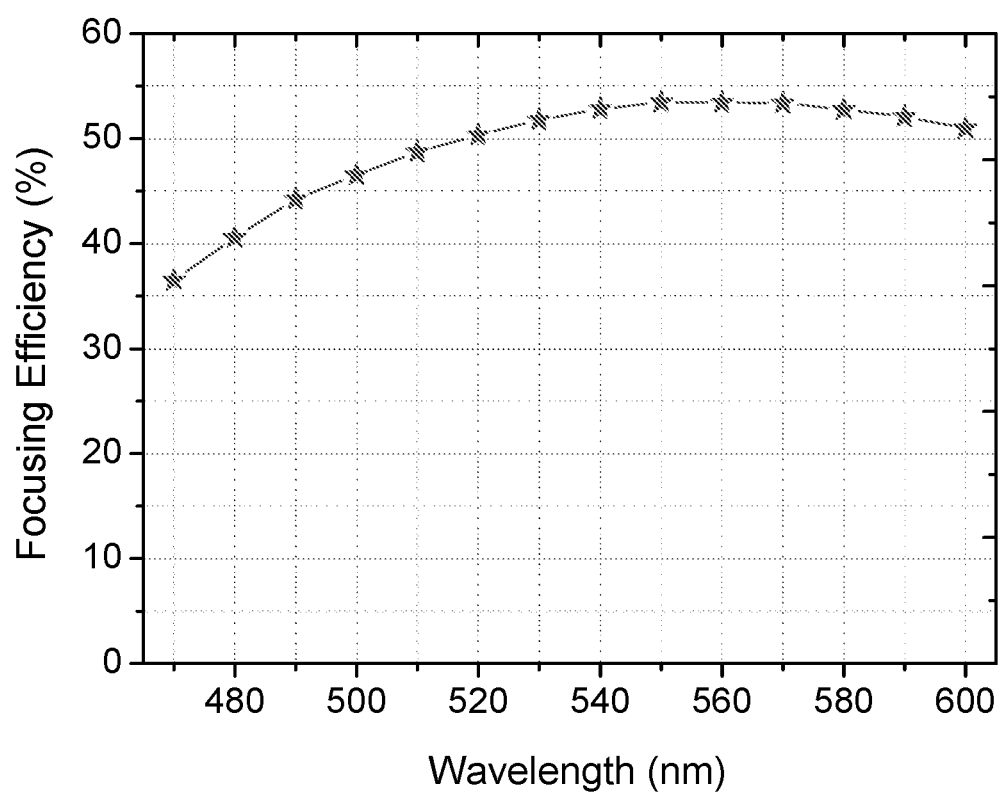
FIG. 8 illustrates measured focusing efficiency of oil immersion meta-lens under circularly polarized incidence.

Parts (d), (e) and (f) show corresponding analysis of parts (a), (b) and (c) for a meta-lens designed at 405 nm. The scale bar for parts (a) and (d) is about 200 nm. That is, P\part (d), (e) and (f) show similar characterization using an oil immersion meta-lens designed at about 405 nm: namely the focal spot (FIG. 7(d)), average FWHM and Strehl ratio (203±3.5 nm and 0.82 respectively, FIG. 7(e)), and intensity versus the background (FIG. 76(f)). The peak focusing efficiencies of these meta-lenses are about 53% and about 32%. FIG. 8 illustrates measured focusing efficiency of oil immersion meta-lens designed at about 532 nm with NA of about 1.1 under circularly polarized incidence. The focusing efficiency and Strehl ratio for the meta-lens designed at about 405 nm are lower compared to its counterpart at about 532 nm because the design wavelength is shorter, which results in a lower tolerance for fabrication errors.

Immersion Meta-Lens for Diffraction-Limited Imaging

The immersion meta-lens can be designed for normal incidence at a given wavelength, implying it corrects monochromatic aberrations for an on-axis point source. If the meta-lenses are used for wide-field imaging, due to the spatial extent of the object, monochromatic aberrations such as coma and astigmatism may reduce the spatial resolution. To address this aspect and to achieve diffraction-limited imaging over a larger area, one can perform scanning imaging instead of wide-field imaging. Therefore, the oil immersion meta-lens can be integrated into a scanning confocal microscope (such as, for example, a Witek, Alpha 300RS), as shown in FIG. 3(b).

The target can be mounted on a piezo stage, and scanned horizontally by a diffraction-limited focal spot from an oil immersion meta-lens with NA of about 1.1 designed at $\lambda_d$ of about 532 nm. The scattered light can be collected by an achromatic refractive objective, and subsequently focused into a multi-mode fiber with an example core diameter of about 50 μm connected to a spectrometer and its associated charge-coupled device (CCD) camera.

For each movement of the piezo stage, a spectrum can be recorded, and the CCD counts at 532 nm can be taken to contribute to the intensity of a pixel, as shown in FIGS. 9(a) to 4(e). Such a configuration can also obtain photo-luminescence or Raman images.

Figure 9:
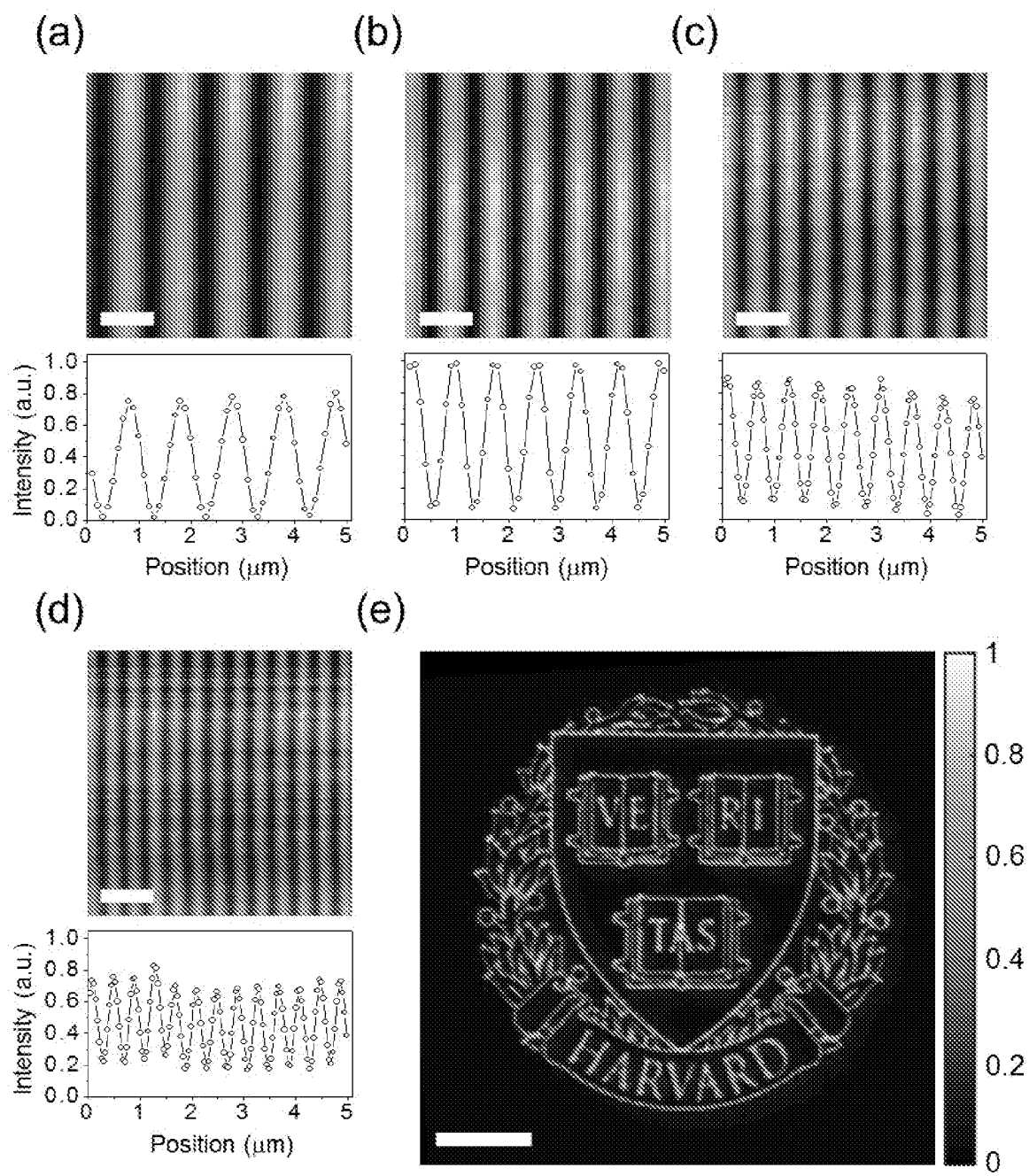
FIG. 9 illustrates confocal imaging with an oil immersion meta-lens.

FIG. 9 illustrates confocal imaging with an oil immersion meta-lens design at 532 nm with NA=1.1. Parts (a)-(d) of FIG. 9 show the images of example resolution targets including metallic stripes designed with equal line widths and gaps of 500 nm, 400 nm, 300 nm and 200 nm, respectively. The insets show the intensity along the horizontal direction through the center of each image. Part (d) is a slightly blurred and the intensity contrast is lower because the feature size approaches the resolution limit of the confocal microscope. Parts (a)-(d) show scanning images for metallic stripes fabricated by e-beam lithography followed by metal deposition and lift-off process. The scale bar is about 1 μm. The insets show mean peak-to-peak values of (b) 1 μm, (c) 783 nm, (d) 593 nm, (e) 400 nm with standard deviations smaller than 10%. The piezo was moved by 100 nm, 50 nm and 37.5 nm per step for (a-b), (c) and (d), respectively.

Figure 10:
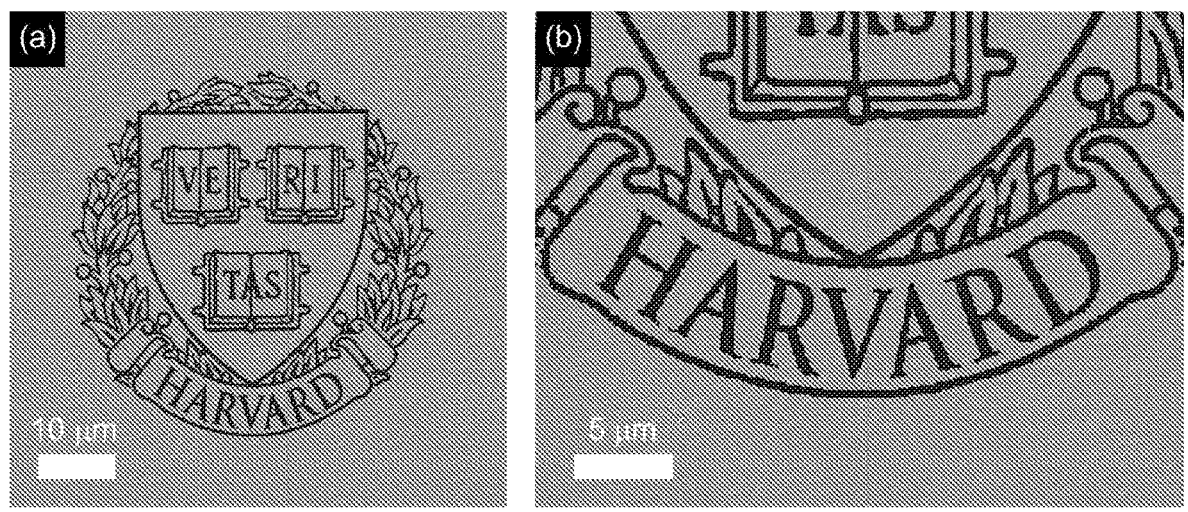
FIG. 10 illustrates scanning electron microscope images of a logo prepared by focusing ion beam milling.

Part (e) shows a scanning image of a logo for a larger scanning region of 60 μm by 60 μm. The piezo may be moved by 200 nm per step. This target may be fabricated by focused ion beam milling. The scale bar is about 10 μm. FIG. 10 illustrates scanning electron microscope (SEM) images of the logo prepared by focusing ion beam milling on an 80-nm-thick gold film. Part (a) of FIG. 10 shows a SEM image for the entire logo. Part (b) shows a magnified SEM image at the bottom of part (a). The minimal line width of the character "H" is, e.g., about 265 nm.

Design Considerations

The immersion meta-lenses can be designed using the geometric phase principle, which can focus/collect light for a specific circular polarization. For the applications that involve polarization insensitive meta-lenses, waveguiding effects can be used to impart the desired phase. For example, one can use nano-pillars (or other nano-features) with circular cross section and control the phase by changing their diameters. The proposed immersion meta-lenses can be monochromatic. The operation bandwidth can be expanded by engineering the resonance or dispersion of nanostructures, increasing the height of nanostructures to cover phase modulation for more than about $2\pi$ radians or adding a refractive lens to the meta-lens since they have opposite chromatic dispersions.

In one or more implementations, the scanning microscopic imaging can be carried out using stage scanning, which can be slow compared to the use of galvo mirror for laser scanning microscopy. The galvo mirror can include a pair of small mirrors to rapidly deflect the laser beam. High speed scanning microscopy can be implemented using meta-lens by adding another layer of metasurface to correct the aberrations (mainly coma aberration) such that the size of focal spot is still diffraction-limited for off-normal incidence, or by integrating an array of immersion meta-lenses to reduce the scanning area of each meta-lens. The latter is promising for achieving the large field of view (e.g., a few cm×a few cm) desired in many applications, especially in laser lithography, where the accuracy of a galvo mirror is insufficient.

Figure 11:
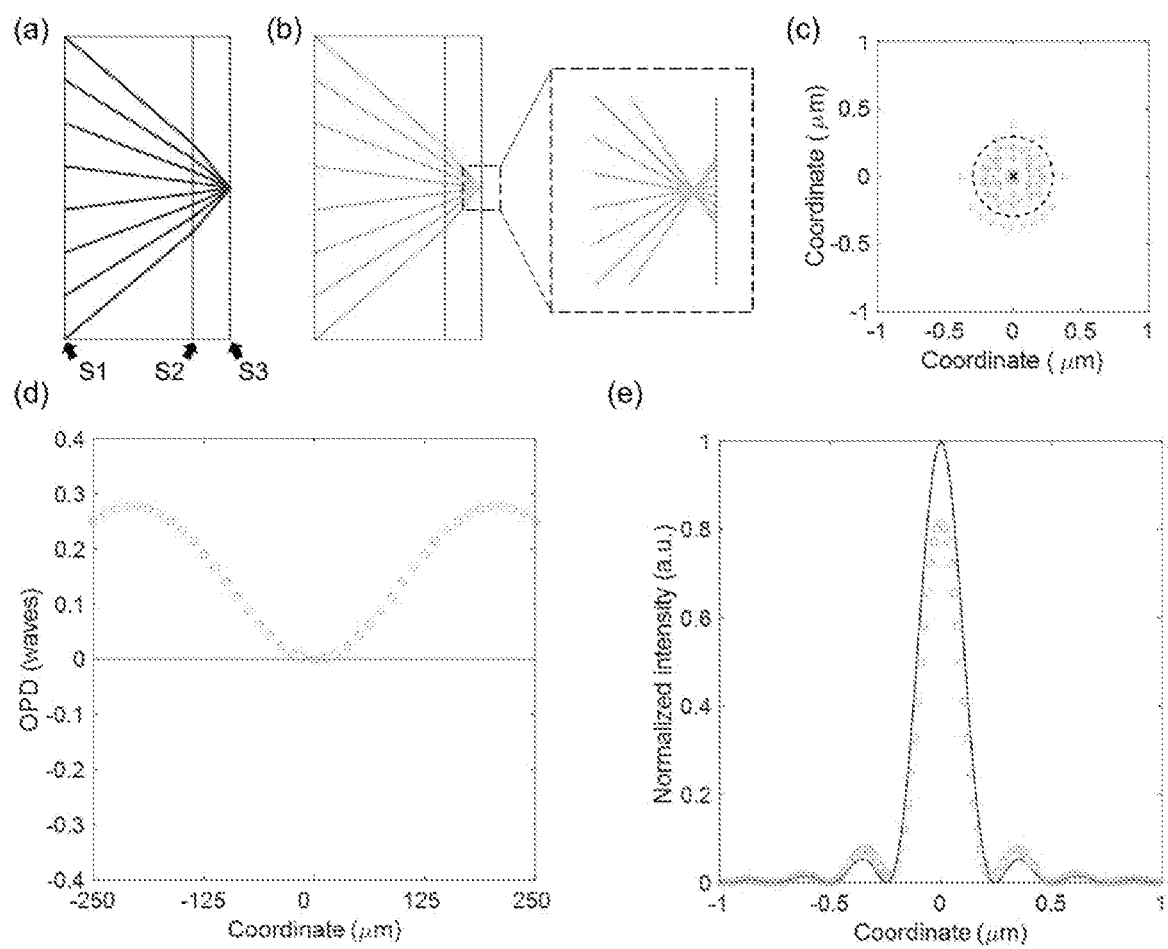
FIG. 11 illustrates ray-tracing simulation analyzing effect of variations in cover glass thickness.

Furthermore, cover glasses usually have ~±5 μm error in thickness. In case of designing water immersion meta-lens, the inaccuracy of substrate thickness can induce spherical aberration. This results in focal length shift and might broaden the focal spot if the spherical aberration is larger than the tolerance of meta-lens, which is dependent on the NA. The smaller the NA, the larger is the tolerance. As shown in FIG. 11, the water immersion meta-lens can still be diffraction-limited up to NA=1.1 considering the ±5 μm thickness error.

FIG. 11 illustrates ray-tracing simulation at about 532 nm analyzing the effect of variations in cover glass thickness. Part (a) shows a ray-tracing diagram for a water immersion meta-lens with NA of about 1.1. This water immersion meta-lens was designed such that all rays, after passing through an about 170-μm-thick cover glass, cross at a single point. The labels refer to: S1: immersion meta-lens; S2: the interface between cover glass and water; and S3: focal plane. Part (b) shows a ray-tracing diagram for the case when the cover glass thickness is changed by about 5 μm, e.g. to about 175 μm. The about 5 μm thickness error results in a focal plane shift (see inset) due to spherical aberration. Part (c) shows a spot diagram showing the intersection points of rays on the focal planes of cases of parts (a) and (b). The circle shows the diameter of diffraction-limited Airy disk. Since most of intersected points in part (b) still fall into the diffraction-limited Airy disk, the about 5 μm thickness error results in weak spherical aberration. Part (d) shows an optical path difference (OPD) with respect to the chief ray as a function of the radial coordinate of meta-lens. Part (e) shows a comparison of the intensity of focal spot for the cases of parts (a) and (b). The weak spherical aberration lowers the Strehl ratio to about 0.8.

Note that the immersion meta-lenses can be tailored for any immersion liquid, and also for multiple layers of different refractive indices. This is especially beneficial for bio-related imaging. Conventional immersion objectives are designed for a single layer of immersion liquid; this introduces significant spherical aberrations when they are used to focus light into, e.g. biological tissue. The immersion meta-lens can, be designed by considering the refractive index of epidermis and dermis to focus light in the tissue under human skin with no additional design and fabrication complexity.

Phase Profile of Immersion Meta-Lenses

The phase profiles can be determined through a commercial ray-tracing software such as, for example, OpticsStudio from Zemax Inc., considering the configuration shown in FIG. 3. The thickness of cover glass substrate can be measured by a micrometer (such as, for example, an CPM1, Thorlabs Inc.) and input into ray-tracing software as a parameter. The phase profiles of immersion meta-lenses can be described by a polynomial:

$$\varphi(r) = \sum_{i=1}^{N} a_i \left(\frac{r}{R}\right)^{2N}$$

where R is the radius of immersion meta-lens, and $r=\sqrt{x^2+y^2}$ is the polar coordinate. The coefficients $a_i$ can be optimized through an algorithm in the ray-tracing software for minimizing the spread of the cross-point of each ray on focal plane. FIG. 12 illustrates a table I listing polynomial coefficients of immersion meta-lens phase profiles of example immersion meta-lenses. The data of last row with the largest diameter may be used for confocal scanning imaging.

Measurement Set-Up for Characterizing the Focal Spots

Meta-lenses can be characterized using a custom-built microscope including a fiber-coupled laser source, linear polarizer, quarter-waveplate, and an immersion objective lens paired with its tube lens to form an image on a CMOS camera with a pixel size of 2.2 μm. For measuring the water and oil immersion meta-lenses, an Olympus water immersion objective may be used (such as, for example, a LUMP-LFLN, 60×, NA=1) and a Nikon oil immersion objective (CFI, 100×, NA=1.25) paired with their corresponding tube lenses of focal length f=180 mm and f=200 mm, respectively.

Simulation

Three-dimensional full wave simulation may be performed by a commercial software (such as, for example, software provided by Lumerical Inc.) based on the finite-difference time-domain method (FDTD). An array of $TiO_2$ nano-fins is arranged in such a way that it diffracts light with conversed polarization state to a particular angle. Periodic and perfectly matched layer boundary conditions can be used along transverse and longitudinal directions with respect to the propagation of incident circularly polarized light. The length and width of the $TiO_2$ nano-fin can be swept within a region considering fabrication constrains to reduce the polarization conversion efficiency. Polarization conversion efficiency can be calculated by dividing the total diffracted optical power around the particular angle by the input optical power.

It is to be understood that the term "design" or "designed" (e.g., as used in "design wavelength," "design focal length" or other similar phrases disclosed herein) refers to parameters set during a design phase; which parameters after fabrication may have an associated tolerance.

As used herein, the singular terms "a," "an," and "the" may include plural referents unless the context clearly dictates otherwise. Thus, for example, reference to an object may include multiple objects unless the context clearly dictates otherwise.

As used herein, the terms "couple," "coupled," and "coupling" refer to an operational connection or linking. Coupled objects can be directly connected to one another or can be indirectly connected to one another, such as via one or more other objects.

Spatial descriptions, such as "above," "below," "up," "left," "right," "down," "top," "bottom," "vertical," "horizontal," "side," "higher," "lower," "upper," "over," "under," and so forth, are indicated with respect to the orientation shown in the figures unless otherwise specified. It should be understood that the spatial descriptions used herein are for purposes of illustration only, and that practical implementations of the structures described herein can be spatially arranged in any orientation or manner, provided that the merits of embodiments of this disclosure are not deviated by such arrangement.

As used herein, the terms "approximately," "substantially," "substantial" and "about" are used to describe and account for small variations. When used in conjunction with an event or circumstance, the terms can refer to instances in which the event or circumstance occurs precisely as well as instances in which the event or circumstance occurs to a close approximation. For example, when used in conjunction with a numerical value, the terms can refer to a range of variation less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, two numerical values can be deemed to be "substantially" the same if a difference between the values is less than or equal to ±10% of an average of the values, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

Additionally, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified.

While the present disclosure has been described and illustrated with reference to specific embodiments thereof, these descriptions and illustrations do not limit the present disclosure. It should be understood by those skilled in the art that various changes may be made and equivalents may be substituted without departing from the true spirit and scope of the present disclosure as defined by the appended claims. The illustrations may not be necessarily drawn to scale. There may be distinctions between the artistic renditions in the present disclosure and the actual apparatus due to manufacturing processes and tolerances. There may be other embodiments of the present disclosure which are not specifically illustrated. The specification and drawings are to be regarded as illustrative rather than restrictive. Modifications may be made to adapt a particular situation, material, composition of matter, method, or process to the objective, spirit and scope of the present disclosure. All such modifications are intended to be within the scope of the claims appended hereto. While the methods disclosed herein have been described with reference to particular operations performed in a particular order, it will be understood that these operations may be combined, sub-divided, or re-ordered to form an equivalent method without departing from the teachings of the present disclosure. Accordingly, unless specifically indicated herein, the order and grouping of the operations are not limitations of the present disclosure.

What is claimed is:

1. An optical imaging apparatus, comprising:
a metasurface lens comprising a substrate and a plurality of nano-structures patterned on a first side of the substrate; and
imaging optics disposed in a spaced apart relationship with a second side of the substrate, the second side being opposite the first side on which the nano-structures are patterned, a surface of the imaging optics and the second side of the substrate defining a space for accommodating an immersion fluid;
wherein the metasurface lens is configured to direct light incident on the plurality of nano-structures towards the imaging optics through the space accommodating the immersion fluid; and
wherein the imaging optics include a confocal microscope including a cover-glass, wherein the surface of the imaging optics includes a first surface of the cover-glass, wherein the cover-glass is configured to accommodate a target, and wherein the metasurface lens is configured to focus the incident light on the target.

2. The apparatus of claim 1, further comprising the immersion fluid disposed in the space.

3. The apparatus of claim 2, wherein the substrate of the metasurface lens has a refractive index that is matched to a refractive index of the immersion fluid.

4. The apparatus of claim 1, wherein the plurality of nano-structures include a plurality of nano-structures extending from the first side of the substrate.

5. The apparatus of claim 1, wherein the plurality of nano-structures include titanium dioxide.

6. The apparatus of claim 1, wherein the metasurface lens has a numerical aperture of at least about 1.1 in a visible spectrum.

7. The apparatus of claim 1, wherein each of the plurality of nano-structures has an associated cell size p, wherein the cell size p satisfies a condition of:

$$p \le \frac{\lambda_d}{2 \cdot NA},$$

where $\lambda_d$ denotes a wavelength of the light incident on the plurality of nano-structures, and NA denotes a numerical aperture of the metasurface lens.

8. The apparatus of claim 1, wherein the imaging optics includes a microscope objective lens, wherein the surface of the imaging optics includes a surface of the microscope objective lens, and wherein the metasurface lens is configured to focus the incident light within the space accommodating the immersion fluid.

9. The apparatus of claim 1, wherein the confocal microscope includes a stage configured to move the target in relation to a position of a focal spot of the light focused by the metasurface lens and an imaging device configured to capture an image of the target.

10. The apparatus of claim 1, wherein the metasurface lens is configured to focus the light, having a wavelength of about 532 nm, incident on the plurality of nano-structures towards the imaging optics with a focal spot having an average full-width at half-maximum of about 240 nm and a Strehl ratio of about 0.94.

11. The apparatus of claim 1, wherein the metasurface lens is configured to provide a diffraction-limited imaging with a spatial solution of about 200 nm.

12. The apparatus of claim 1, wherein the immersion fluid includes at least one of oil or water.

13. The apparatus of claim 1, wherein the plurality of nano-structures include at least one of an oxide, a nitride, a sulfide, or an element.

14. The apparatus of claim 1, wherein the light incident on the plurality of nano-structures has a wavelength in a near infrared region or an infrared region of an electromagnetic spectrum, and wherein the plurality of nano-structures include at least one of silicon or gallium phosphide.

15. The apparatus of claim 1, wherein a cross-section of at least one of the plurality of nano-structures has a two-fold symmetry.

16. The apparatus of claim 1, wherein the plurality of nano-structures are arranged to define a phase profile such that the metasurface lens is configured as an infinite-conjugate immersion lens.

17. A method for imaging a target, comprising:
providing a metasurface lens having a substrate having a first side and a second side, and a plurality of nano-structures patterned on the first side of the substrate;
disposing imaging optics in a spaced apart relationship with the second side of the substrate, the second side being opposite to the first side on which the plurality of nano-structures are patterned;
disposing an immersion fluid in a space defined by a surface of the imaging optics and the second side of the substrate;
disposing a cover-glass within the space, the cover-glass accommodating the target;
emitting a visible light incident onto the plurality of nano-structures of the metasurface lens; and
directing the visible light incident onto the plurality of nano-structures towards the imaging optics through the immersion fluid and the cover-glass;
wherein directing the visible light incident onto the plurality of nano-structures includes focusing the visible light at a focal spot on the target accommodated by the cover-glass.

18. The method of claim 17, wherein the plurality of nano-structures extend from the first side of the substrate.

19. The method of claim 17, wherein the metasurface lens has a numerical aperture of about 1.1.

20. The method of claim 17, wherein each of the plurality of nano-structures has an associated cell size p, wherein the cell size p satisfies a condition of:

$$p \le \frac{\lambda_d}{2 \cdot NA},$$

where $\lambda_d$ denotes a wavelength of light incident on the plurality of nano-structures, and NA denotes a numerical aperture of the metasurface lens.

21. The method of claim 17, wherein directing the visible light incident onto the plurality of nano-structures includes focusing the visible light at a focal spot within the immersion fluid.

22. The method of claim 21, further comprising capturing an image of the target.

23. The method of claim 17, further comprising:
   capturing an image of the visible light directed towards the imaging optics; or
   recording a spectrum of the visible light directed towards the imaging optics.

24. The method of claim 17, further comprising emitting a collimated visible light and directing the collimated visible light onto the plurality of nano-structures.

* * * * *